(12) United States Patent
Wong

(10) Patent No.: US 6,503,302 B2
(45) Date of Patent: Jan. 7, 2003

(54) AIR PURIFIER

(75) Inventor: Ying Man John Wong, New Territories (CN)

(73) Assignee: Yellow Tiger Works Limited, Shatin (HK)

( * ) Notice: Subject to any disclaimer, the term of this patent is extended or adjusted under 35 U.S.C. 154(b) by 32 days.

(21) Appl. No.: 09/817,990

(22) Filed: Mar. 27, 2001

(65) Prior Publication Data

US 2002/0139252 A1 Oct. 3, 2002

(51) Int. Cl.$^7$ .......................... B01D 47/16; B01D 47/06
(52) U.S. Cl. ........................................ 96/316; 96/319
(58) Field of Search .................. 95/149, 224, 199, 95/219, 216, 217; 96/270, 273, 274, 277, 322, 324, 327, 328, 311, 313, 314, 315, 316, 319

(56) References Cited

U.S. PATENT DOCUMENTS

| | | | |
|---|---|---|---|
| 1,039,008 A | * | 9/1912 | Anderson |
| 1,134,432 A | * | 4/1915 | Aylsworth |
| 2,271,642 A | * | 2/1942 | Holzwarth |
| 2,817,415 A | * | 12/1957 | Sykes |
| 3,139,331 A | * | 6/1964 | Boudreau |
| 3,990,870 A | * | 11/1976 | Miczek |
| 4,588,535 A | | 5/1986 | Foidl ........................ 261/22 |
| 5,041,274 A | * | 8/1991 | Kagi, Sr. |
| 5,192,345 A | | 3/1993 | Pala ........................... 55/223 |
| 5,938,820 A | | 8/1999 | Peters et al. .................. 95/186 |

FOREIGN PATENT DOCUMENTS

| | | |
|---|---|---|
| DE | 197 53 227 A1 | 6/1999 |
| EP | 0 249 400 A1 | 6/1987 |
| JP | 92533442 | 9/1997 |
| JP | 11-057369 | 3/1999 |

OTHER PUBLICATIONS

Australian Patent Office Search Report CS/01/0047.

* cited by examiner

*Primary Examiner*—Duane S. Smith
(74) *Attorney, Agent, or Firm*—Alix, Yale & Ristas, LLP

(57) ABSTRACT

A domestic air purifier includes a plurality of non-linear conduits through which room air is drawn and into which fluid is introduced to remove particulate matter from the air. A plurality of non-linear conduits having a plurality of fluid spraying nozzles provides thorough mixing between air and fluid to maximize the removal of particulates from the air. The fluid circulates continuously from a reservoir through the nozzles and conduits back to the reservoir. Simple fluids, such as water, are preferably used, although disinfectants, deodorants and/or scents may be added to the fluid.

7 Claims, 3 Drawing Sheets

AIR PURIFIER

BACKGROUND OF THE INVENTION

1. Field of the Invention

This invention relates to an air purifier to remove at least some impurities from circulating air and in particular, although not necessarily solely, a freestanding electrically powered air purifier for domestic use.

2. Description of the Prior Art

Domestic air purifiers have become increasingly popular in recent times. The popularity is at least partially motivated by the decreasing quality of air in urban areas and also the greater appreciation of the adverse effects on health from such poor air quality.

Although various air purifiers are used in industry to at least partially clean exhaust gases, such industrial installations are generally not suitable for domestic use. The size of the installations and failure to be a single independent apparatus are problems. Also, the majority of the methods used are not suitable for miniaturisation and independent operation as a domestic appliance.

Amongst domestic air purifiers, one popular method uses a physical filter such as paper, carbon or a similar physical filter. However, such filters cause on-going problems in cleaning and/or replacing filter cartridges. Also, to be a factor against most airborne impurities, a relatively fine filter must be used. The filter itself with such small apertures creates considerable resistance to airflow through the apparatus. This resistance requires an increased motor size to provide sufficient airflow. The increase in motor size itself causes an increase in the initial cost of the appliance itself. It would also be understood that the increased motor size causes ongoing increased costs in the power usage as well as generally greater noise from such systems.

A further air purifying method used in domestic appliances comprises appliances relies on electrostatic attraction to perform the filtering or purification. In such appliances, air is passed over a plurality of charged panels that seek to attract the impurities through the opposition in electrostatic charge. This requires panels having a relatively large surface area for the passing air stream. Such electrostatic based appliances require the panels to be regularly removed, cleaned and replaced. The performance of such appliances drops sharply if the panels are not properly and regularly cleaned as the accumulation of charge across the panel neglects its effect. Furthermore, such appliances will only work on electrically charged particles and inert particulate materials will not be kept.

SUMMARY OF THE INVENTION

An object of the present invention is to provide a new and improved air purifier that will overcome some of the difficulties in the prior art or at least provide the public with a viable alternative.

According to a first aspect of the invention, the air purifier comprises a plurality of tubes through which room air is drawn, a fluid reservoir, fluid conduits leading from the fluid reservoir to nozzles communicating with each of the plurality of tubes and means for pumping the fluid. Room air is propelled through the plurality of tubes where the air comes in contact with and preferably mixes with the fluid spraying from the nozzles. This intimate contact between the air and the fluid causes air-borne impurities, in particular dust and particulate matter to be retained in the fluid. Purified air is then allowed to pass into the room through an air outlet. The fluid circulates continuously from the reservoir to the plurality of tubes and back to the reservoir.

Preferably the air purifier apparatus is contained within a housing having air inlet and air outlet apertures. Each of the plurality of tubes is preferably non-linear and more preferably spiral in configuration to increase the length of time during which the air and fluid are in contact. The fluid reservoir is advantageously arranged in the base of the housing so fluid can return to the reservoir by gravity. The plurality of tubes terminates above and drains into the fluid reservoir. Air circulation is provided by pushing or pulling air from a space provided above the fluid in the reservoir, thereby drawing air in an inlet through the plurality of spiral tubes.

To increase the contact between the air and fluid, each tube making up the plurality of tubes may provided with a plurality of fluid delivering spray nozzles.

Further aspects of this invention will become apparent to those skilled in the art upon reading the following description.

BRIEF DESCRIPTION OF THE DRAWINGS

Preferred embodiments of the invention will now be described with reference to the following drawings in which.

DETAILED DESCRIPTION OF THE PREFERRED EMBODIMENTS

Figure 1:
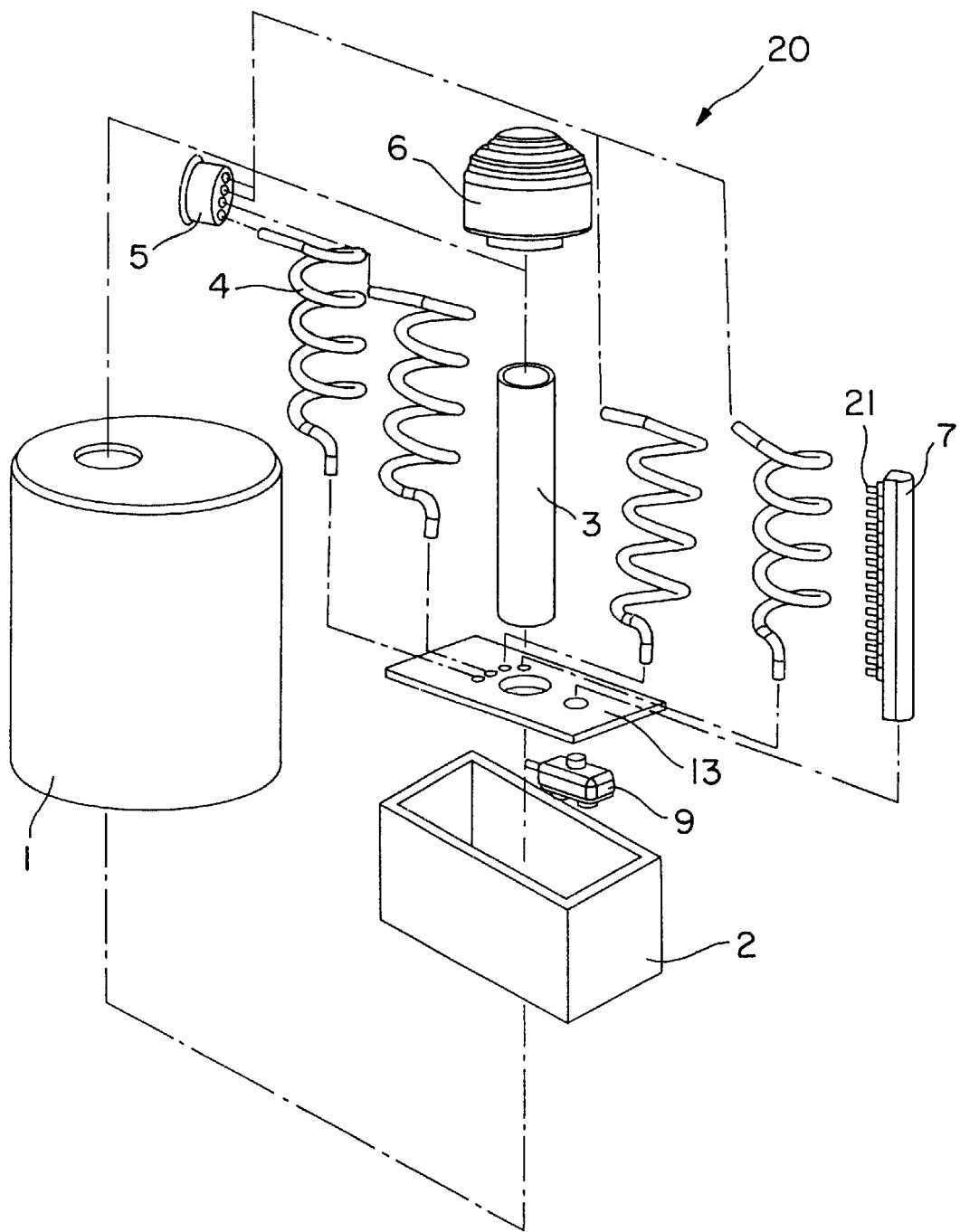
FIG. 1 shows an exploded perspective view of an embodiment of the air purifier in accordance with the present invention.

This invention seeks to provide an air purifying apparatus (20), one possible embodiment of which is shown in exploded form in FIG. 1. As shown on FIG. 1, the apparatus (20) may be provided as an independent stand-alone apparatus generally contained within a housing (1). This particular air purifying apparatus is configured for use in domestic situations. Factors such as portability and safety suggest that the provision of the entire apparatus within the single and dependent housing (1) may be preferable.

The housing (1) is provided with an air inlet (5) and an air outlet (6). This allows the introduction of air from the surrounding room through the inlet and return of at least partially purified air through the outlet (6). The apparatus (20) also includes at least one conduit (4) that forms at least part of the air pathway from the inlet (5) to the outlet (6). As shown in this particular example, the conduit (4) may comprise a plurality of conduits such as the four tubes provided in this embodiment. The conduits should provide a relatively narrow passageway for the passage of air although larger diameter conduits could be provided with alternative arrangements. To ensure sufficient air quantity through the apparatus, a plurality of conduits are provided.

Each of the conduits (4) is associated with at least one fluid outlet nozzle (21) for the introduction of fluid to the conduit. As will be explained subsequently, the purpose of the fluid is to remove particulate material from the air and, therefore, a relatively high degree of mixing between the passing air and the fluid is preferred. For this reason, the plurality of smaller diameter conduits may be preferred and each of the conduits (4) may be provided in a complex geometric form to increase the length of each conduit within the apparatus. This arrangement increases mixing time with the fluid.

Referring to the preferred embodiment as shown in FIGS. 1–4, it can be seen that the conduits (4) are provided as spiral tubing although other complex geometric form such as helixes or a plurality of substantially parallel tubes in a grid like pattern could be provided. A manifold (7) as shown on FIG. 1 is provided in which a plurality of fluid nozzles (21) are connected. The manifold (7) carries fluid from a fluid chamber (2) so that the fluid may be introduced to each of the conduits (4), preferably through a plurality of nozzles for each conduit (4).

Figure 2:
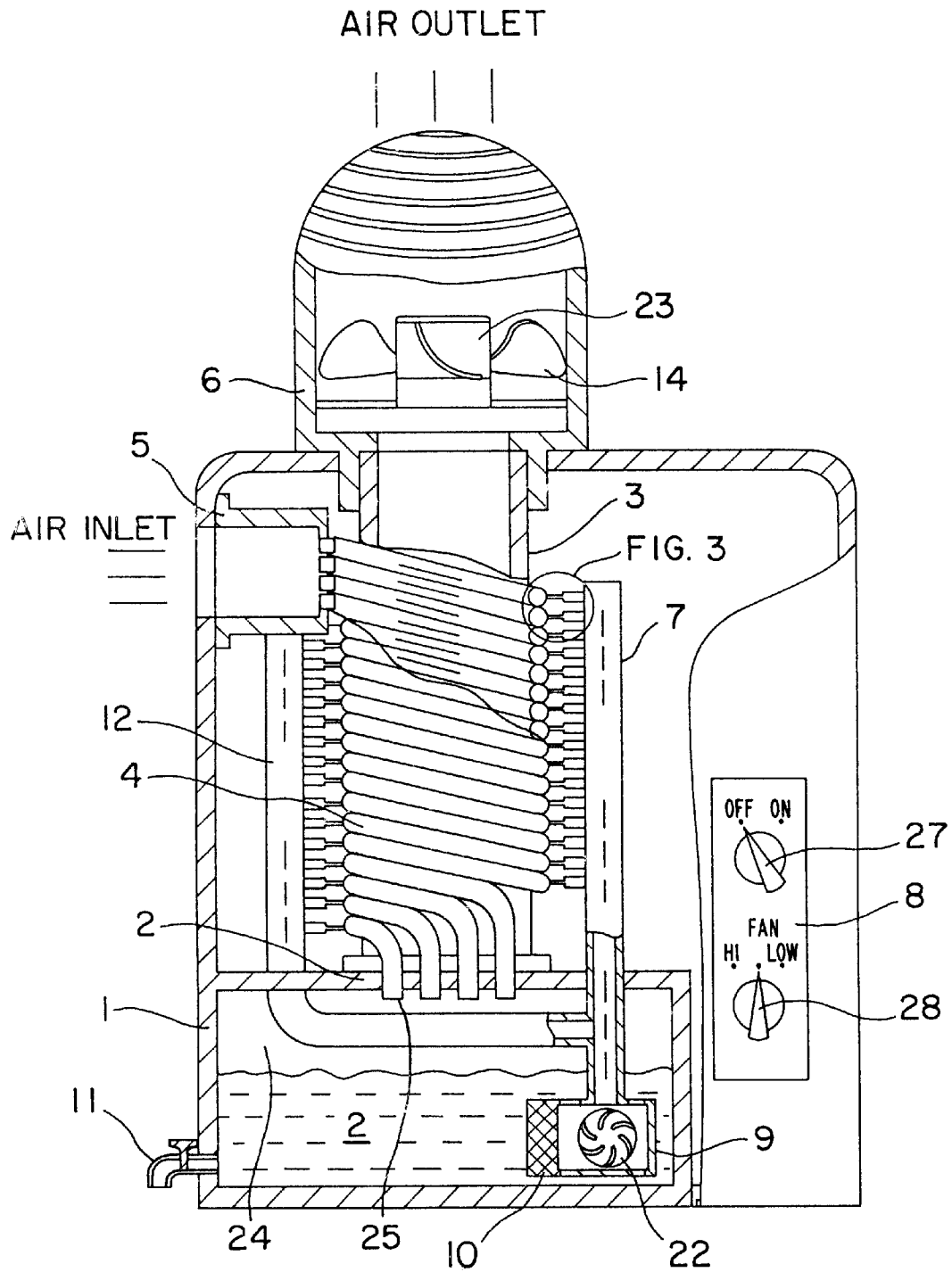
FIG. 2 shows a cross-sectional view through the assembled apparatus of FIG. 1.

As shown in FIG. 1, the apparatus may include panel a (13) for the mounting of various items and separation of the fluid chamber (2) from the remainder of the apparatus. Such a physical separation is not necessarily required. The apparatus also includes a fluid drive means in the form of a motor or other suitable apparatus (9) to drive an impeller (20) as shown on FIG. 2. The purpose of the fluid drive mechanism is to draw fluid from the chamber (2) and supply this through the manifold (7) to the nozzles (21) under pressure. Referring to FIG. 2, it can be seen that a further manifold (12) may be provided on an opposed side of the apparatus to increase the number of nozzles intersecting each conduit (4).

The apparatus also includes air-driving means in the form of a fan, impeller or similar mechanism (14), preferably having its own drive source such as a motor (23). It may be possible to utilise a single motor for both the air and water drive mechanisms in alternative arrangements of the apparatus. In this embodiment, the air driving means such as the fan (14) is provided near the outlet (6) to draw air into the apparatus. An outlet passageway (3) is provided in this embodiment as shown on FIG. 1. It is noticeable that the outlet passage way (3) in the form of a tube is substantially greater in cross section than the total area of the cross sections of the conduits (4). The conduits (4) and air outlet passageway (3) both communicate via an air space (24) above the fluid chamber (2).

A control panel (8) may provide the necessary controls of, preferably, electrically powered motors. Other power sources could be used if desired although for simplicity in operation in domestic installations, main electrical power is often the most convenient power source.

Referring again to FIG. 2, it can be seen that conduits (4) terminate at outlet (25) into the air space (24) above the chamber (2). This provides drainage from the conduit (4) such that the fluid supplied to those conduits may be returned to the chamber (2).

Figure 3:
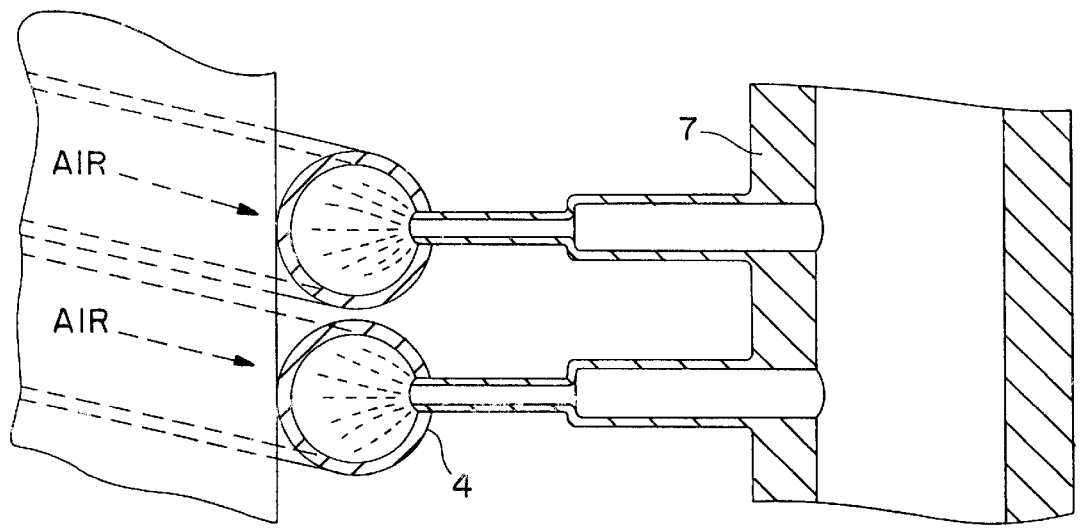
FIG. 3 is a side cross-sectional elevation through a portion of the apparatus of FIGS. 1 and 2 where the fluid nozzles are introduced to conduits.
Figure 4:
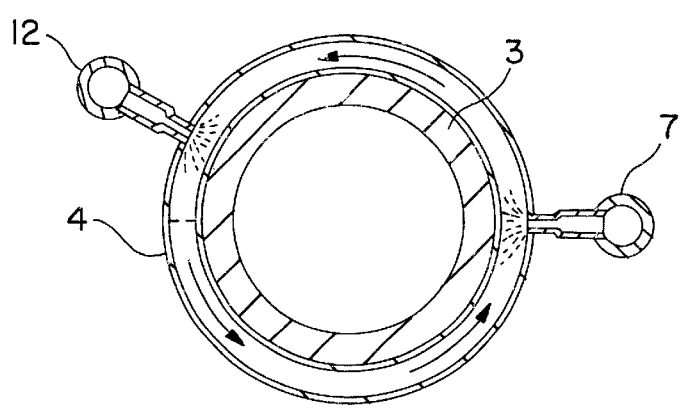
FIG. 4 is a top cross-sectional view through a portion of the conduit, fluid nozzles and outlet air passage way of the apparatus of FIGS. 1 and 2.

Referring to FIG. 3, an enlarged cross sectional view is provided of the introduction of the nozzles (21) to the conduits (4). The nozzles (21) preferably provide fluid in spray form to increase the contact between the fluid and the passing air. Referring to FIG. 4, a plan view through the conduit (4), outlet passage (3) and manifolds (7) and (12) is shown. It can be seen that the manifolds need not be directly opposite and may be arranged to fit the apparatus as a whole.

In operation, the apparatus (20) may be supplied with power and activated through the control panel (8). The control panel (8) may include both an operational switch (27) for switching the apparatus on and off as well as a control (28) over the fan speed to control the fan (14) and hence control the quantity of air flowing through the apparatus (20).

Upon activating the apparatus (20), air is drawn into the inlet (5). It should be noted that it may be desirable to provide a relatively coarse filter, vanes or other structure over the inlet (5) to collect the coarsest of particles or stop the introduction of hands or other foreign material into the apparatus. Once the air has progressed into the air inlet (5), it is drawn into the conduit (4) and the air mixes and interacts with fluid introduced through the nozzles (21). The fluid introduced through the nozzle (21) may capture particulate matter both through attraction through electrical charge of the fluid, chemical bonding, precipitation, pH stabilisation, or other mechanisms. The fluid and air then both pass through the conduits (4) to the conduit end (25) at which point the fluid returns to the fluid chamber (2) from which it is drawn.

Air that is returned to the outlet (6) is then drawn through the larger passage way (3) from the open air space (24). These are relatively low-pressure environments compared with the conduits (4) such that the fluid has a chance to form droplets and return to the chamber (2).

A variety of fluids may be used in the apparatus. This particular apparatus is intended for domestic use and, therefore, a simple fluid such as water may be most desirable. Additional additives could be provided into the water to provide disinfection, aromatic qualities or to provide specific attraction of particular air impurities. As shown on FIG. 2, fluid that has captured the particulate matter and returned to the chamber (2) may be recycled through the fluid driving means (22) in the form of a pump or similar for further use. A filter (10) in the fluid chamber may inhibit particulate matter from being recycled.

It should be noted that at least some of the fluid will evaporate into the air passing through the apparatus. Using water has the advantageous effect of adding humidity to the indoor air. Dry air is frequently a problem in buildings with forced air heating and air conditioning systems. Thus, the air purifier in accordance with the present invention may also serve as a humidifier.

Intermittently, the fluid within the chamber (2) may be replaced. If desired, a drain (11) from the fluid chamber (2) can be provided. Alternatively, the chamber (2) may simply be provided as a removable fluid container.

Thus it can be seen that the invention provides an air purifying apparatus that may overcome some of the disadvantages of the prior art. The use of water or other fluids to collect the particulate matter reduces the need for cleaning of filters etc. Although a water filter (10) may be provided, the majority of contaminants will be retained in the fluid chamber (2) and may not progress towards the filter (10) causing cleaning to be required less frequently. Furthermore, as the filter (10) only seeks to inhibit the re-circulation of impurities returning to the fluid stream, a slower degradation of performance will occur should the filter not be cleaned regularly.

In another important aspect, the filter (10) is not within the air stream and there is less resistance to the airflow through the apparatus as a whole allowing a reduction in motor sizes, noise, etc.

Preferred embodiments of the invention have been described with reference to various numbers of conduits and other parts. Known equivalents are deemed incorporated herein and it should be noted that the preferred embodiments are provided by way of example only and are not to be considered limiting of the scope of the invention as defined by the appended claims.

What is claimed is:

1. An air purifying apparatus including:

a housing defining an internal space;

an air inlet;

an air outlet;

a fluid chamber for containing fluid;

a plurality of conduits extending between a first end in communication with the air inlet and a second end communicating with an air space above a fluid contained in the fluid chamber;

air driving means to drive air through said plurality of conduits by exhausting air from said air space above the fluid, thereby drawing air through said conduits to replace air exhausted from said fluid chamber;

at least one fluid outlet nozzle in each said conduit to introduce said fluid in spray form to each said conduit to mix with passing air and bind or collect particulate material;

fluid drive means to drive said fluid to said at least one nozzle; and drainage outlets from said conduit to return fluid to said fluid chamber, said drainage outlets corresponding to the second ends of each said conduit.

2. The air purifying apparatus of claim 1, wherein each said conduit comprises a non-linear conduit.

3. The air purifying apparatus of claim 2, wherein each said conduit comprises a tube.

4. The air purifying apparatus of claim 3, wherein said tube is in the form of a spiral having an axis, said axis being common to said plurality of conduits.

5. The air purifying apparatus of claim 1, wherein said fluid chamber is provided adjacent a base of said apparatus.

6. The air purifying apparatus of claim 1, wherein said at least one fluid outlet nozzle comprises a plurality of nozzles per conduit.

7. The air purifying apparatus of claim 6, wherein said air space above said fluid chamber and an air passage way to said outlet is at a lower absolute value of pressure than air passing through said conduit.

* * * * *